(12) United States Patent
Athalye

(10) Patent No.: US 8,981,673 B2
(45) Date of Patent: Mar. 17, 2015

(54) POWER SUPPLY THAT MAINTAINS AUXILIARY BIAS WITHIN TARGET RANGE

(75) Inventor: Praneet Jayant Athalye, Morrisville, NC (US)

(73) Assignee: Cree, Inc., Durham, NC (US)

( * ) Notice: Subject to any disclaimer, the term of this patent is extended or adjusted under 35 U.S.C. 154(b) by 215 days.

(21) Appl. No.: 13/417,652

(22) Filed: Mar. 12, 2012

(65) Prior Publication Data

US 2013/0234621 A1 Sep. 12, 2013

(51) Int. Cl.
*H05B 37/02* (2006.01)
*H02M 3/158* (2006.01)
*H05B 33/08* (2006.01)
*H02M 1/00* (2006.01)

(52) U.S. Cl.
CPC ...... *H02M 3/158* (2013.01); *H02M 2001/0006* (2013.01); *H05B 33/0815* (2013.01)
USPC ............................ 315/307; 315/242; 315/410

(58) Field of Classification Search
CPC ....................................................... H05B 37/02
USPC ............. 326/93; 315/242, 234, 291, 410, 411
See application file for complete search history.

(56) References Cited

U.S. PATENT DOCUMENTS

| | | | |
|---|---|---|---|
| 5,691,889 A | 11/1997 | Bazinet et al. | |
| 5,811,963 A | 9/1998 | Elwell | |
| 6,459,174 B1 | 10/2002 | Marino | |
| 6,583,589 B1* | 6/2003 | Jennings et al. | 315/411 |
| 6,859,021 B2 | 2/2005 | Link | |
| 7,355,455 B2* | 4/2008 | Hidaka | 326/121 |
| 2003/0016545 A1* | 1/2003 | Jutras et al. | 363/18 |
| 2005/0243022 A1 | 11/2005 | Negru | |
| 2006/0103363 A1 | 5/2006 | Miftakhutdinov | |
| 2008/0231115 A1 | 9/2008 | Cho et al. | |
| 2009/0108908 A1 | 4/2009 | Yamadaya | |
| 2009/0190379 A1 | 7/2009 | Melanson et al. | |
| 2009/0295228 A1 | 12/2009 | Ochi | |
| 2010/0039083 A1 | 2/2010 | Moriarty, Jr. | |

FOREIGN PATENT DOCUMENTS

| | | |
|---|---|---|
| DE | 201 09 957 U1 | 8/2002 |
| EP | 0 709 950 A2 | 5/1996 |
| WO | WO 02/43244 A1 | 5/2002 |
| WO | WO 2010/057115 A2 | 5/2010 |

OTHER PUBLICATIONS

International Search Report and Written Opinion for International Application No. PCT/US2013/030135 mailed Apr. 10, 2014.

* cited by examiner

*Primary Examiner* — Don Le
(74) *Attorney, Agent, or Firm* — Brinks Gilson & Lione

(57) ABSTRACT

A power supply includes a switch configured to control flow of current output from an inductor to an output of the power supply. The switch receives a switching signal from a control circuit. An auxiliary bias is generated to power the control circuit. A bias circuit outputs a bias signal that is used to generate the auxiliary bias. The bias circuit senses a level of the auxiliary bias to control output of the bias signal. Output of the bias signal may be controlled to maintain the level of the auxiliary bias at a target level or within a target range.

25 Claims, 11 Drawing Sheets

US 8,981,673 B2

POWER SUPPLY THAT MAINTAINS AUXILIARY BIAS WITHIN TARGET RANGE

TECHNICAL FIELD

The present disclosure relates generally to power supplies, and more particularly to maintaining an auxiliary bias of a power supply within a target range.

BACKGROUND

Power supplies may be used in electronic applications to convert an input voltage to a desired output voltage to power one or more electronic devices. Some power supplies may be classified as either a linear power supplies or a switch-mode power supply (SMPS). Switch-mode power supplies may be configured to operate more efficiently than linear power supplies. A switched-mode power supply may include a switch that, when switching on and off, stores energy in an inductor and discharges the stored energy to an output of the switched mode power supply. The switch may be controlled by a controller, which outputs switching signals to turn the switch on and off.

DETAILED DESCRIPTION

The present disclosure describes a switch-mode power supply that includes a control circuit configured to control switching of switching circuitry, and a bias circuit configured to supply power to the control circuit. The bias circuit may output a bias signal that powers the control circuit. The bias circuit may generate and/or output the bias signal independent of a switching signal that is output from the control circuit to control switching of the switching circuitry. The bias circuit may be configured to operate in a hysteretic manner to generate and/or output the bias signal. The bias circuit may include a bias controller that is configured to sense a level of the bias being applied to the control circuit. Based on the level that is sensed, the bias controller may be configured to determine whether to adjust one or more output signals that may be used to control the level of the bias.

Switch-mode power supplies may be used in various applications, such as lighting applications. For example, switch-mode power supplied may be used to power a light source, such as one or more light-emitting diodes (LEDs). The LEDs may be connected to an output of the switch-mode power supply and/or may be configured as an output load of the switch-mode power supply. In addition, the LEDs may be powered by a direct current (dc) signal having a dc voltage. In one example, the dc voltage may be approximately 200 volts, although other voltages may be used to power the LEDs. In some example configurations, the switch-mode power supply may include and/or be connected to a rectifier that converts an alternating current (ac) signal to a rectified ac signal. As an example, the rectifier may receive a 120 volt ac signal, such as from a wall outlet, and convert the 120 volt ac signal to a rectified 120 volt ac signal. The switch-mode power supply may then convert the ac rectified signal to a dc signal, such as a 200 volt dc signal, to power the LEDs.

FIGS. 1-6 show various example configurations of switch-mode power supplies. The switch-mode power supplies shown in FIGS. 1-6 are shown as boost converters, although similar configurations may be used in other types of switch-mode power supplies, such as buck or flyback converters, and/or may be used in power supplies that are configured to perform ac-dc, dc-ac, and/or ac-ac conversion.

Figure 1:
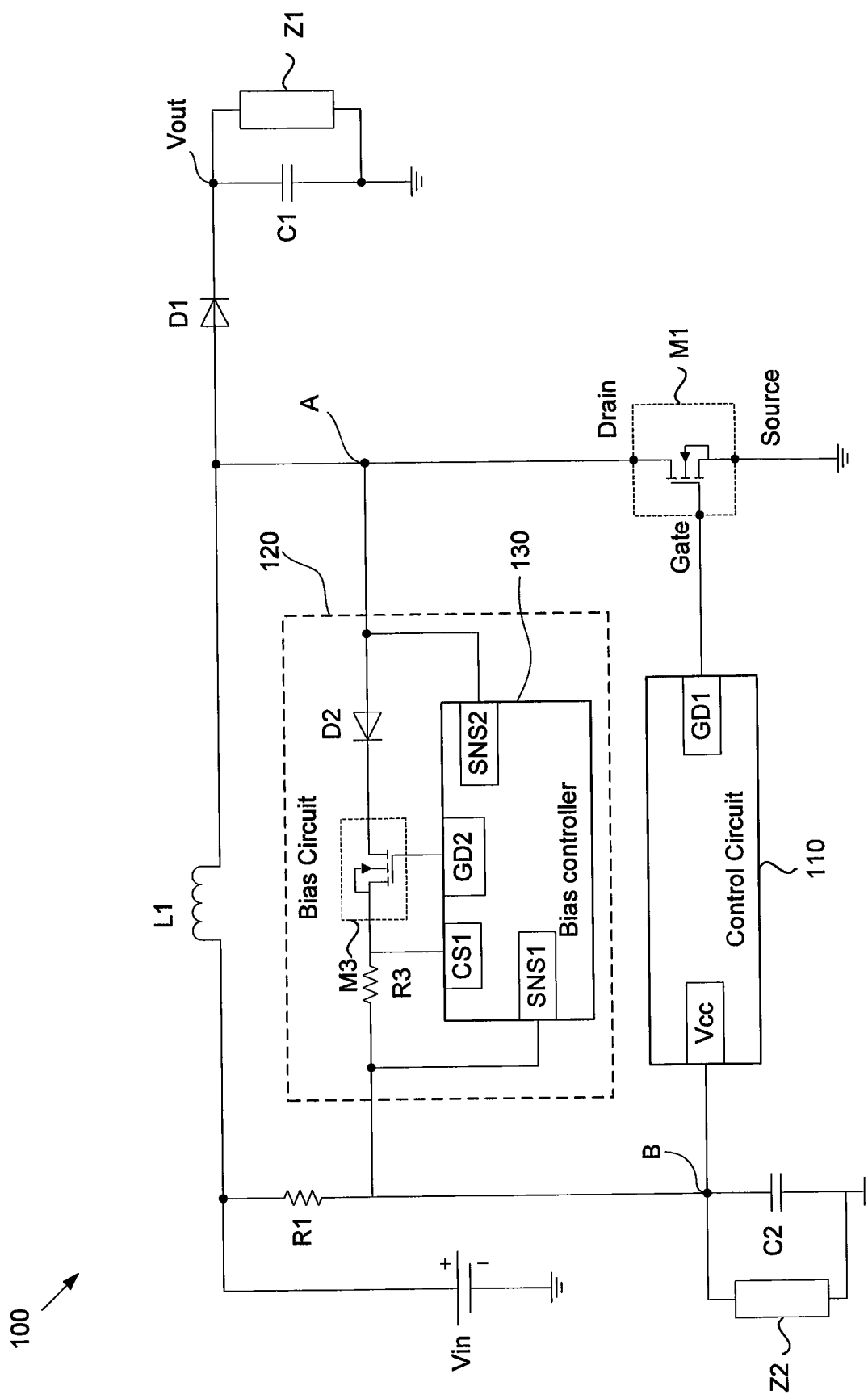
FIG. 1 shows a schematic diagram of an example switch-mode power supply.

FIG. 1 shows a schematic diagram of an example switch-mode power supply 100. The example switch-mode power supply 100, switching circuitry comprising a switch M1. The switch M1 may be an electronic component or device that switches between an "on" state and an "off" state. In one example, the switch M1 may be an electronic component or device that switches between being completely "on" and completely "off." The switch M1 may be a metal-oxide-semiconductor field-effect transistor (MOSFET), although other types of switches may be used.

The switch M1 may be in communication with and/or connected to an inductor L1. Where the switch M1 is a MOSFET, a drain of the MOSFET M1 may be connected to the inductor L1. The inductor L1 may be connected to the switch M1, and may also be connected to and/or in communication with an input voltage source Vin. The input voltage source may be a constant direct current (dc) source or a rectified alternating current (ac) source. In some configurations, the input voltage source Vin may be a component of the switch-mode power supply 100. In other example configurations, the input voltage source Vin may be a component that is separate from and/or external to the switch-mode power supply 100 and that supplies the dc or rectified ac signal to the switch-mode power supply 100. The example switch mode power supply 100 may further include a diode D1 that is connected to and/or in communication with the switch M1. Where the switch M1 is a MOSFET, the diode D1 may be connected to the drain of the MOSFET. The diode may be configured to be in an "on" state or an "off" state. The diode D1 may be also be connected to and/or in communication with an output of the switch-mode power supply 100. When the diode is "on,"

current output from the inductor L1 may pass through the diode D1 to the output. Alternatively, when the diode is "off," current output from the inductor L1 may not pass through the diode D1 to the output.

The output of the switch-mode power supply 100 may include an output capacitor C1 connected in parallel with an output load Z1. The output load Z1 may include one or more electronic devices and/or components connected in series, in parallel, or a combination thereof. The output load Z1 may be configured to draw current, and an output voltage Vout may be generated across the output load Z1. The output load may include one or more resistors, capacitors, inductors, diodes, transistors, or other types of active or passive components. In some example configurations, the output load Z1 may be configured to perform a predetermined function, such as output light. For example, the output load Z1 may include one or more LEDs, such as high brightness LEDs. The output load Z1 and/or the switch-mode power supply 100 may be part of a lighting system, such as a downlight, spot light, light bulb, lamp, light fixture, sign, retail display, transportation, lighting for emergency vehicles, or portable lighting system, as examples. In some example configurations, an output voltage of 200 dc volts may be generated across the output load Z1 and/or across the output of the switch-mode power supply 100, although other voltages may be generated. Other configurations of the output load Z1 are possible. The output load Z1 may or may not be included on the same circuit board or in the same package as the components of the switch-mode power supply 100.

During operation of the example switch-mode power supply 100, when the switch M1 is turned "on," electrical current output from the inductor L1 may pass through the switch M1 to ground. Also, when the switch M1 is "on," the inductor L1 may be charged by the input voltage source Vin. Further, when the switch M1 is "on," a voltage across the switch (e.g., a drain-source voltage) may be approximately zero volts, which may reverse bias the diode D1, causing no current or substantially no current to pass through the diode D1 to the output. Alternatively, when the switch M1 is "off," no current passes through the switch M1. Also, when the switch M1 is turned "off," a voltage (e.g., the drain-source voltage) across the switch M1 may be at a level that forward biases the diode D1, causing current output from the inductor to pass through the diode D1 to the output of the switch-mode power supply 100.

The switch-mode power supply 100 may further include a control circuit 110 that is configured to control switching of the switch M1. The control circuit 110 may control switching of the switch M1 by generating and/or outputting switching signals that switch the switch M1 "on" and "off." The switching signal output from the control circuit 110 may also determine a time duration that the switch M1 is "on." The switching signal may be of any type that can turn the switch M1 "on" and "off." For example, the switching signal may be a direct current (dc) signal that has at least two levels, including a first dc level that turns the switch M1 "on" and a second dc level that turns the switch M1 "off." Alternatively, the switching signal may be a pulse-width modulated (PWM) signal. Each of the PWM signals may have an associated amplitude, frequency, period, and/or duty cycle. The control circuit 110 may be configured to determine the amplitude, frequency, period, and/or duty cycle for each of the PWM signals. In some configurations, the control circuit 110 may be configured to determine to maintain the amplitude, frequency, period, and/or duty cycle the same between two or more switching signals and/or may be configured to determine to change the amplitude, frequency, period, and/or duty cycle between two or more switching signals.

The control circuit 110 may be configured to output the switching signals from an output GD1 to an input of the switch M1. Where the switch M1 is a MOSFET, the switching signals may be output to a gate terminal of the MOSFET. When a voltage of the switching signal applied to the gate generates a gate-to-source voltage that exceeds a threshold voltage, the switch M1 may be turned "on." When the voltage applied to the gate generates a gate-to-source voltage that is below the threshold voltage, the switch may be turned "off."

The control circuit 110 may further include a voltage bias input terminal Vcc. The voltage bias input terminal Vcc may be configured to receive a bias signal, such as a bias voltage Vbias that is used to power the control circuit 110, the bias may be referred to as an auxiliary bias or a housekeeping bias. The bias voltage Vbias may be a predetermined amount determined and/or required by the control circuit 110. In one example, the voltage required to power the control circuit 110 may be of an order much less than the input voltage Vin. For example, the voltage Vbias may be in a range of one-twentieth to one-fifth of the input voltage Vin.

The switch-mode power supply 100 may further include a bias circuit 120 that is configured to output a bias signal that is used to power the control circuit 110. The bias signal may generate a bias voltage Vbias that is applied to the voltage bias input terminal Vcc. The bias circuit 120 may include a switch M3 that is in connection with a diode D2. The switch M3 may also be connected to the voltage bias input terminal Vcc of the control circuit 110, for example at node B shown in FIG. 1. The diode D2 may be connected to the switch M3 and may also be connected to the switch M1, for example at node A shown in FIG. 1. Where the switch M1 is a MOSFET, the diode D2 may be connected to the drain of the MOSFET M1.

The switch M3 may be configured to switch between an "on" state and an "off" state. The diode D2 may also be configured to switch between an "on" state and an "off" state. When both the diode D2 and the switch M3 are "on," current may flow through the diode D2 and the switch M3, from node A to node B. The charge flowing from the switch M3 to the node B may be stored in energy storing circuit C2. The energy storing circuit C2 may be connected to the voltage bias input terminal Vcc, and may be configured to generate and/or maintain the voltage bias Vbias that is applied to the voltage bias input terminal Vcc. The energy storing circuitry C2 may be a capacitor, although other types of energy storing circuitry may be used. The energy storing circuitry C2 may be or may include one or more circuit elements, such as one or more capacitors, inductors, resistors, diodes, transistors, batteries, other circuit elements, or any combination thereof, that is capable of storing and discharging energy.

The bias circuit 120 may further include a bias controller 130 that is configured to control switching of the switch M3. The bias circuit may include an output terminal GD2 that is configured to output one or more switching signals that turn the switch M3 "on" and "off." The output terminal GD2 may be in communication with an input terminal of the switch M3. Where the switch M3 is a MOSFET, the input terminal may be a gate of the MOSFET M3. The switching signals applied to the gate M3 may be any type that is configured to turn the switch "on" and "off," such as dc signals or PWM signals. In some example configurations where the switching signals are PWM signals, the bias controller 130 may be configured to change or adjust an associated amplitude, frequency, period, and/or duty cycle between two or more PWM signals in order to control switch M3. In alternative configurations where the switching signals are dc signals, the controller 130 may be configured to output a dc signal at or above a threshold level or value that turns the switch M3 "on." The controller 130 may also be configured to output a dc signal below the threshold level or may cease outputting a dc signal at or above the threshold level to turn the switch M3 from "on" to "off." Various configurations and/or types of switching signals to control switching of the switch M3 are possible.

The bias controller may further include an input terminal SNS1 that is configured to receive and/or sense the bias voltage Vbias at node B. In response to sensing the bias voltage Vbias at node B, the bias controller 130 may be configured to determine whether the bias voltage Vbias is at a target level and/or within a target range. The target level may be within the target range. Additionally, the target range may have and/or be defined by an upper level and a lower level.

The bias controller 130 may be configured to determine whether the bias voltage Vbias sensed at the input terminal SNS1 is too high. The bias controller 130 may determine that the voltage bias Vbias is too high when the sensed voltage bias is at a level that is greater than a bias voltage needed to power the control circuit 110, greater than a predetermined threshold voltage, greater than the target level, and/or greater than the upper bound of the target range. Also, the bias controller 130 may be configured to determine whether the bias voltage Vbias is too low. The bias controller 130 may be configured to determine that the bias voltage Vbias is too low when the sensed bias voltage Vbias is at a level that is less than a bias voltage needed to power the control circuit 110, less than a predetermined threshold voltage, less than the target level, and/or less than a lower bound of the target range.

The bias controller 130 may be configured to control switching of the switch M3 in response to sensing the bias voltage Vbias. Based on the bias voltage Vbias that is sensed at the input terminal SNS1, the bias controller 130 may be configured to determine whether to output a switching signal, to cease outputting a switching signal, and/or to adjust one or more characteristics of the switching signal being output to the switch M3. For example, if the bias voltage Vbias is too high, then the bias controller 130 may be configured to turn the switch M3 "off," such as by ceasing output of the switching signal. Alternatively, the bias controller 130 may be configured to reduce a duty cycle of a PWM signal that is being applied to the switch M3, which may reduce an amount of time that the switch M3 is "on" during a period of the PWM signal. By turning the switch M3 "off" and/or reducing the amount of time that the switch M3 is "on" during PWM cycles, no current or a reduced amount of current may flow through the switch M3, which may eliminate and/or reduce the amount of charge being stored in the energy storing circuit C2. In turn, the bias voltage Vbias at node B may decrease to a desirable level, such as to a target level and/or within a target range.

Similarly, if the bias voltage Vbias is too low, then the bias controller 130 may be configured turn the switch M3 "on," such as by outputting the switching signal to the switch M3. Alternatively, the bias controller 130 may be configured to increase a duty cycle of a PWM signal that is being applied to the switch M3, which may increase an amount of time that the switch M3 is "on" during a period of the PWM signal. By turning the switch M3 "on" and/or increasing the amount of time that the switch M3 is "on" during PWM cycles, current or an increased amount of current may flow through the switch M3, which may increase the amount of charge being stored in the energy storing circuitry C2. In turn, the bias voltage Vbias at node B may increase to a desirable level, such as to the target level and/or within the target range.

The output terminal GD2, the switch M3, the bias voltage Vbias at node B, and the input terminal SNS1 may form a feedback loop in the switch-mode power supply 100. Using the feedback loop, the bias controller 130 may output a switching signal at the output terminal GD2, which may generate a bias voltage Vbias that is fed back to the bias controller 130. The bias controller may compare the sensed bias voltage Vbias that is fed back with the target level or target range and determine whether to adjust the output of the output terminal GD2.

In more detail, the bias controller 130 may output a switching signal to the switch M3, causing the switch M3 to turn "on." By turning "on," current may flow through the switch M3 to node B, causing a bias voltage Vbias to be generated at node B. The level of the bias voltage Vbias may be sensed at the input terminal SNS1, and based on the level that is sensed, the bias controller 130 may determine whether to maintain application of the switching signal, cease application of the switching signal, and/or adjust one or more characteristics of the switching signal in order to maintain the voltage Vbias at or within a target level or target range, or to adjust the voltage Vbias to be at or within a target level or target range.

When current is not flowing through the switch M3 (e.g., because the switch M3 and/or the diode D2 is "off"), the bias voltage Vbias at node B may decrease because charge stored in energy storing circuit C2 may be discharged into a load Z2 that is connected to the energy storing circuit C2. In one example, the load Z2 may be connected in parallel with the energy storing circuit C2. The load Z2 may function as a current sink. Charge that may be stored in the energy storing circuit C2 may be discharged and supplied to the load Z2. Additionally, some charge stored in the capacitor C2 may also be discharged into the voltage bias input terminal Vcc of the control circuit 110. Without the load Z2, charge may only be discharged into the voltage bias input terminal Vcc, and which may prevent the bias voltage Vbias from decreasing from a voltage level that is too high to the target level or a level that is within the target range.

The load Z2 may include one or more electronic devices that are configured to draw current and/or function as a current sink. As non-limiting examples, the load Z2 may include one or more active and/or passive electronic devices, such as resistors, capacitors, inductors, diodes, transistors, or combinations thereof. In addition, the load Z2 may include one or more light-emitting diodes (LEDs), one or more cooling systems, one or more zener diodes, or any combination thereof. The components of the load Z2 may be connected in series, in parallel, or a combination thereof. The load Z2 may include one or more packaged components. The load may provide a function in addition to and/or other than generating a voltage Vbias at the voltage bias input terminal Vcc. For example, the load may actively control optical and/or thermal characteristics of a lighting device and/or a lighting system. Optical and/or thermal characteristics may include color, brightness, and/or temperature, as examples. Alternatively or in addition, the load may provide optical and/or thermal energy to the lighting device and/or the lighting system. FIG. 1 shows the load Z2 being a component of the switch-mode power supply 100 that is external to the control circuit 110. In other configurations, the load Z2 may be an electronic component of the control circuit 110. Various configurations are possible.

During operation of the switch-mode power supply 100, the input voltage source Vin may output and/or supply a dc input signal or a rectified ac input signal. In some examples, a voltage of level of the dc or rectified ac signal may be 120 volts rms, although other voltages may be provided by the input voltage source Vin. At startup of the switch-mode power supply 100, the input signal may pass through a startup resistor R1 and applied to the voltage bias input terminal Vcc, which may power the control circuit 110. The resistor R1 may be configured to supply the appropriate current so that Vcc voltage is raised to the target level and/or within the target range at which the control circuit is configured to operate.

When the control circuit 110 is powered "on," the control signal may be configured to output a switching signal from the output terminal GD1 to the switch M1. Upon receipt of the switching signal, the switch M1 may turn "on." When the switch M1 turns "on," current may flow from the inductor L1 through the switch M1 to ground. When current flows through the switch M1, a voltage across the switch M1 (e.g., the drain-source voltage across the switch M1) may be zero volts or substantially zero volts. When the voltage across the switch M1 is zero volts, the diode D2 may be reverse biased, and current may not from flow from node A through the diode D2.

The switching signal may also turn the switch M1 "off." When the switch M1 turns "off," the voltage across the switch (e.g., the drain-source voltage) may increase. The voltage across the switch M1 may increase to a predetermined threshold level at node A, which may forward bias the D2, turning the diode D2 "on." The input terminal SNS2 may be configured to sense the voltage at node A (e.g., the drain voltage of the switch M1), and may sense when the voltage at node A reaches the threshold level. By sensing the voltage at node A, the bias controller 130 may be configured to turn the switch M3 "on," if the switch M3 is not already in the "on" state. When both the diode D2 and the switch M3 are "on," current at node A may pass through the diode D2 and the switch M3 to node B. As previously described, the energy storing circuit C2 may store the charge received at node B, generating a bias voltage Vbias at node B. As current is supplied from the switch M2 and charge is stored by the energy storing circuit C2, the voltage across the energy storing circuit C2 may increase, thereby increasing the bias voltage Vbias being applied to the voltage bias input terminal Vcc.

The input terminal SNS1 of the bias controller 130 may sense the bias voltage Vbias being applied to the voltage bias input terminal Vcc. The bias controller 130 may be configured to know the target level or target range at which the control circuit 110 is configured to operate and/or at which the bias voltage Vbias is to be maintained. The bias controller 130 may compare the bias voltage Vbias at node B with the target level or target range to determine whether the bias voltage Vbias is at the target level or within the target range. If the bias voltage Vbias is at the target level or within the target range, then the bias controller 130 may be configured to maintain application of the switching signal on the switch M3 and/or to not adjust any characteristics of the switching signal being output to the switch M3.

Alternatively, if the sensed bias voltage Vbias is not at the target level or is outside of the target range, then the bias controller 130 may be configured to change the switching signal that is being applied to the switch M3. Where the bias voltage Vbias is too high, the bias controller 130 may be configured to turn "off" the switch M3 and/or reduce the amount of time in between switching cycles that the switch M3 is "on" in order to reduce the voltage bias Vbias. For example, where the switching signal is a dc signal, the bias controller 130 may be configured to cease output of the dc signal or may be configured to output the dc signal at a level that is less than a threshold level that turns the switch M3 "on." Alternatively, where the switching signal is a PWM signal, the bias controller 130 may be configured to decrease the duty cycle of the switching signal.

After turning "off" the switch M3 and/or reducing the amount of time that the switch M3 is "on" during switching cycles, the bias voltage Vbias may decrease to a level that is at the target level and/or is within the target range. In some situations, the voltage bias Vbias may decrease to a level that is too low, such as below the target level or below a lower bound of the target range. The input terminal SNS1 may sense that the bias voltage Vbias has decreased too low. In response, the bias controller 130 may be configured to change the switching signal. For example, where the switching signal is a dc signal, the bias controller 130 may be configured to output the dc signal at a level that is at or above a threshold level that turns the switch M3 "on." Alternatively, where the switching signal is a PWM signal, the bias controller may be configured to increase the duty cycle of the PWM signal to increase the amount of time that the switch M3 is "on" during switching cycles.

The bias controller 130 may continually sense the bias voltage Vbias at node B and adjust the switching signal applied to the switch M3 based on the sensed voltage so that the bias voltage Vbias is maintained at a target level and/or within a target range. In this way, the bias circuit 120 may be configured to supply a bias signal to power the control circuit 110 in a hysteretic manner. As the bias voltage Vbias increases to an upper bound of a target range, the bias controller 130 may adjust the switching signal applied to the switch M3 to decrease the bias voltage Vbias. Also, as the bias voltage Vbias decreases to a lower bound of a target range, the bias controller 130 may adjust the switching signal applied to the switch M3 to increase the bias voltage Vbias.

Additionally, the bias circuit 120 may be configured to control the bias voltage Vbias applied to the control circuit 110 independent of the switching signals output from GD1 that are being applied to the switch M1. Rather than monitor the switching signal output from GD1 and/or an output Vout of the switched-mode power supply 100 and adjusting the switching signal applied to the switch M3 based on the output from GD1 and/or the output Vout of the switch-mode power supply 100, the bias circuit 120 may monitor the bias voltage Vbias itself, and determine whether to adjust the switching signals applied to the switch M3 based on the level of the bias voltage Vbias.

Additionally, the bias circuit 120 and/or the bias controller 130 may be configured to set and/or determine a maximum limit on the amount of time that the switch M3 may be "on." In some example configurations, the maximum limit may be a predetermined value. The maximum limit may prevent saturation by enabling the bias circuit 120 and/or the bias controller 130 to know the amount of increase in the inductor current. In some example embodiments, the bias circuit 120 and/or the bias controller 130 may be capable of monitoring the current passing through M3 by sensing the voltage across R3 (e.g., by sensing a voltage difference between the SNS1 and the CS1 input terminals). By sensing the voltage across R3, the bias controller 130 may be configured to take protective action if the current exceeds a predetermined threshold value.

Figure 2:
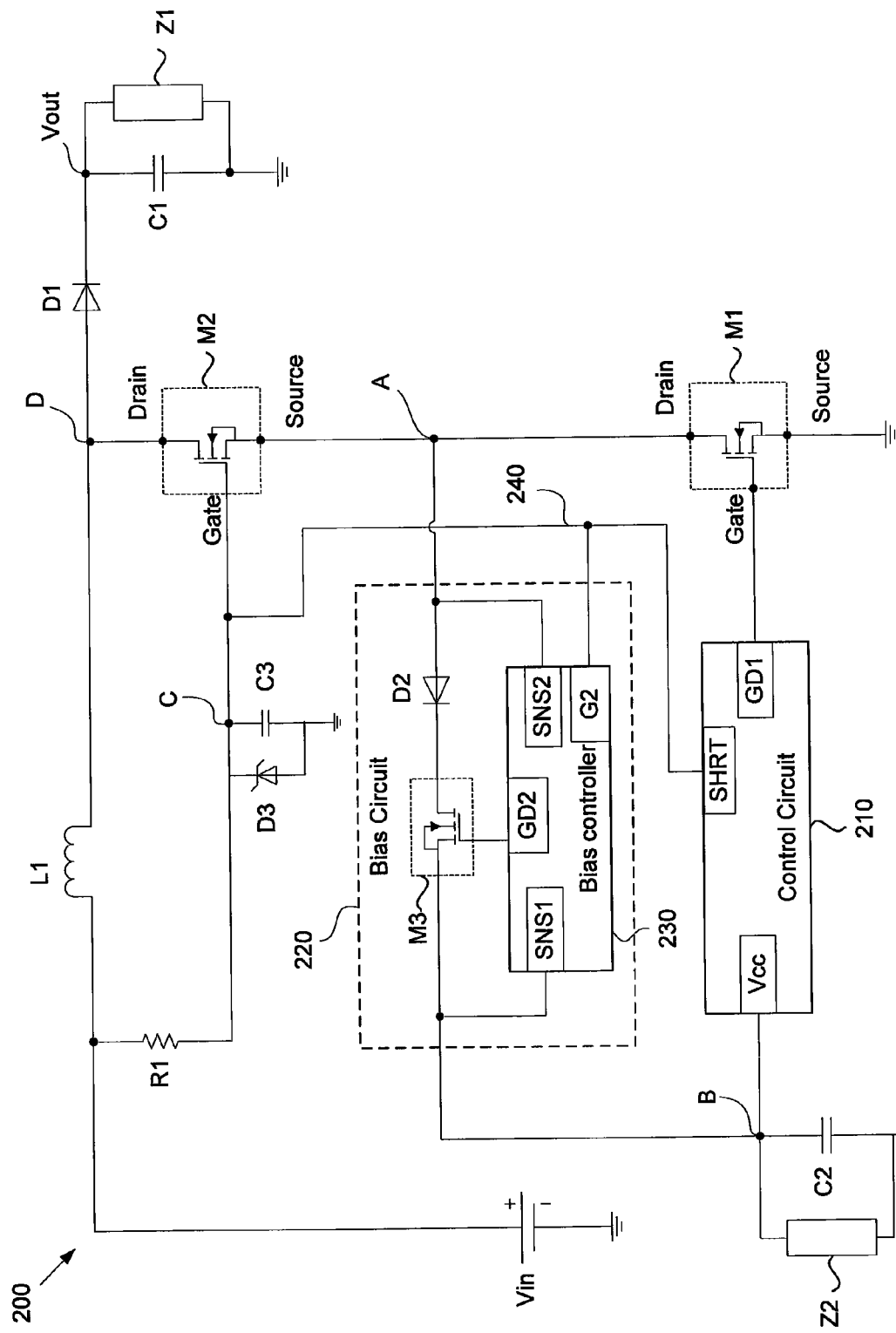
FIG. 2 shows a schematic diagram of an alternative example switch-mode power supply, illustrating an example cascode version of the switch-mode power supply shown in FIG. 1.

FIG. 2 shows a schematic diagram of an example switch-mode power supply 200, illustrating an example cascode configuration of the example switch-mode power supply 100, shown in FIG. 1. In the example switch-mode power supply 200, the switching circuitry may include two switches, a first switch M1 and a second switch M2, that are configured in a cascode configuration. One advantage of the cascode configuration may be that the switch M1 and a switch M3 in a bias circuit 220 may both be MOSFETs, may be rated for a low voltage, and/or may have a small size for easy integration with a bias controller 230 as an integrated circuit. Additionally, the second switch M2 may be rated for a high voltage that may be equal to or higher than the output voltage. The first switch M1 of the example switch-mode power supply 200 may be in communication with a control circuit 210, which outputs switching signals via an output terminal GD1 to turn the first switch M1 "on" or "off." The example switch-mode power supply 200 may further include a second switch M2 that is connected to the first switch M2. The first switch M1 and the second switch M2 may be connected to a diode D2 of a bias circuit 220. Where the first switch M1 and the second switch M2 are both MOSFETs, a drain of the first switch M1 may be connected to the diode D2, and a source of the second switch M2 may be connected to the drain of the first switch M1 and the diode D2.

The example switch-mode power supply 200 may further include a startup resistor R1. The startup resistor R1 may also be connected to an input terminal (e.g., a gate) of the switch M2, for example at node C. The startup resistor R1 may also be connected at node C to a capacitor C3 connected in parallel with a zener diode D3. In one example configuration, the capacitor C3 may have a small capacitance and/or may be configured to charge relatively quickly, which may provide the example switch-mode power supply 200 with fast startup capabilities.

During a startup operation of the switch-mode power supply 200, the voltage at node C may rise from zero volts and may be clamped to a voltage of the zener diode D3. As the voltage at node C rises, the bias controller 230 may sense the voltage of node C at input terminal G2 and turn on M3 by sending a switching signal from the output terminal GD2. Also, during startup, the voltage at node B may initially be zero volts. When the third switch M3 is turned "on," the capacitor C2 may be charged by current passing through the inductor L1, the second switch M2, the diode D2, and the third switch M3. As the capacitor C2 is being charged, the voltage across the capacitor C2 (i.e., the voltage at node B) may rise to the voltage at node C that is clamped by the zener diode D3 less the threshold voltages of the second switch M2, the third switch M3, and the voltage drop across the diode D2.

During steady-state operation of the switch-mode power supply 200, the first switch M1 may be configured to be turned "on" by receiving a switching signal from an output terminal GD1 of the control circuit 110. When the first switch M1 is turned "on," the second switch M2 may also turn "on," and current output from the inductor L1 may pass through the second switch M2 and the first switch M1 to ground. Subsequently, the first switch M1 may be turned "off." Also, at this time, the second switch M2 may remain "on." Because the first switch M1 is turned "off," voltage across the first switch M1 (e.g., drain-source voltage across the first switch M1) may increase from a level of zero volts when the first switch M1 was "on." The voltage across the first switch M1 may increase to a threshold voltage level that forward biases the diode D2. An input terminal SNS2 of the bias controller 230 may sense that the voltage at node A is at the threshold voltage level and the bias controller 230 may output a switching signal to turn the switch M3 "on," provided that the switch M3 is not already "on." Because the second switch M2 is "on," current may flow from the inductor L1 through the second switch M2, the diode D2 and the switch M3 of the bias circuit 230, to node B, where a bias voltage Vbias is generated and applied to a bias voltage input terminal Vcc of the control circuit 210.

The bias controller 230 may be configured to control switching of the switch M3 by outputting switching signals from an output terminal GD2 to an input terminal (e.g., a gate) of the switch M3, as previously described. The switch-mode power supply 200 may be configured so that the second switch M2 turns "off" when the switch M3 is turned "off." In some example configurations, to ensure that the second switch M2 is "off," an input terminal (e.g., the gate) of the second switch M2 at node C may be connected to an input terminal SHRT of the control circuit 210 via a connection 240. The control circuit 210 at the input terminal SHRT may be configured to reduce the voltage level of the input terminal of the second switch M2, which may ensure that a voltage lower than a threshold voltage of the second switch M2 is applied between the gate-source terminals of the second switch M2 and that the second switch M2 is completely "off." When the second switch M2 is "off," voltage at node D (e.g., the drain of the second switch) may increase, and forward bias the diode D1 so that current output from the inductor L1 is sent to the output of the switch-mode power supply 200.

Figure 2A:
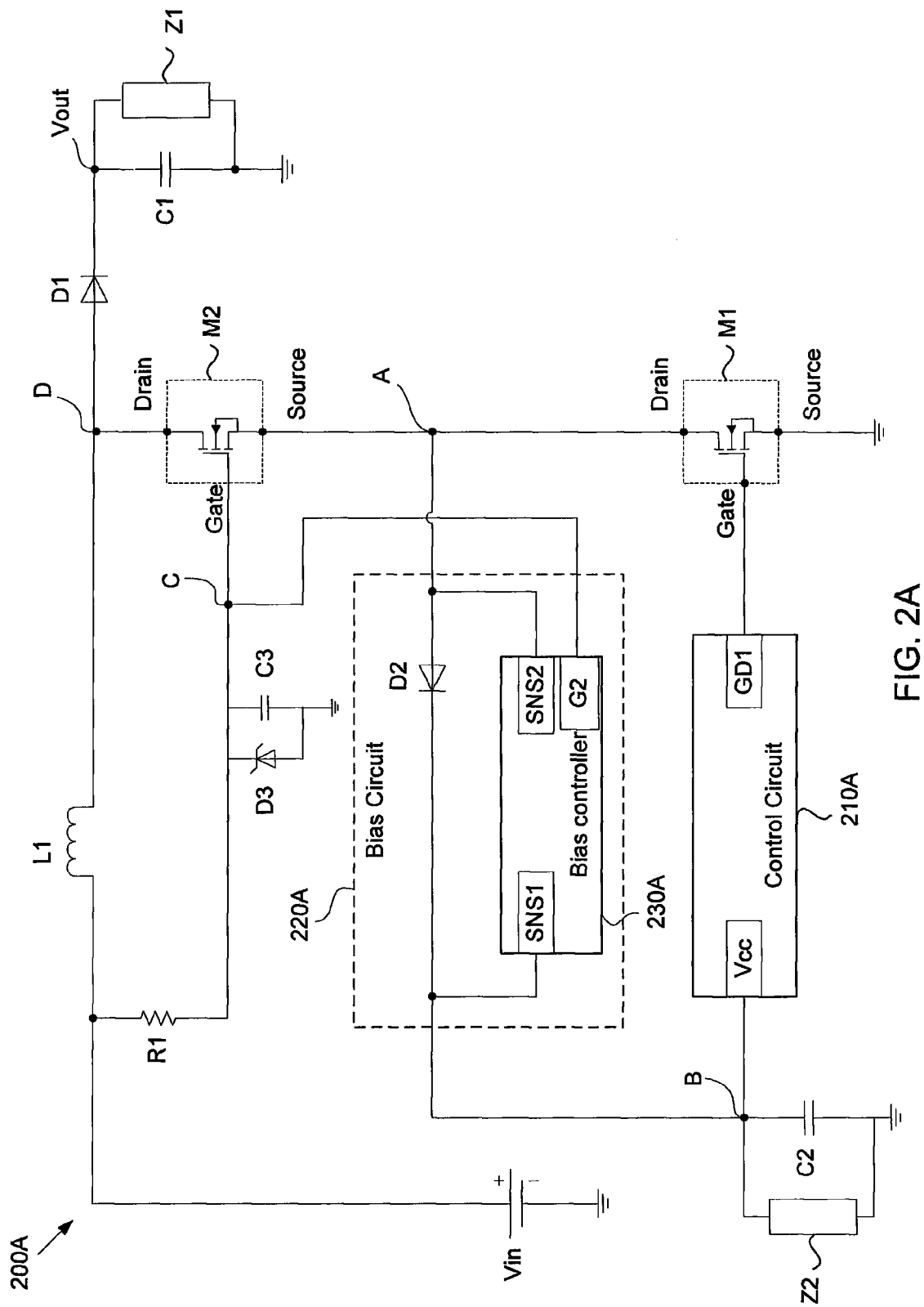
FIG. 2A shows a schematic diagram of a second alternative example switch-mode power supply, illustrating another example cascode version of the switch-mode power supply shown in FIG. 1.

FIG. 2A shows a schematic diagram of an alternative example switch-mode power supply 200A. The example switch-mode power supply 200A may be similar to the example switch-mode power supply 200 shown in FIG. 2. One difference between the switch-mode power supply 200A and the switch-mode power supply 200 is that there a bias circuit 210A may not include the third switch M3 and a control circuit 210A may not have a terminal SHRT connected to an input terminal of a second switch M2. Rather, a diode D2 is connected to both node A and node B.

During startup of the example switch-mode power supply 200A, voltages at nodes B and C may initially be zero. Current through a startup resistor R1 may charge a capacitor C3, which may cause the voltage across the capacitor C3 (i.e., the voltage at node C) to rise. As the voltage at node C rises beyond the gate-source threshold of the second switch M2, the second switch M2 may turn "on." The voltage at node C may continue to rise to a threshold level that causes the diode D2 to be forward biased. When the second switch M2 is "on" and the diode D2 is forward biased, current discharged from the boost inductor L2 may start flow through the second switch M2 and the diode D2 to node B, which may increase the voltage at node B. Current discharged from the boost inductor L1 may continue to flow through the second switch M2 and the diode D2 until the zener diode D3 clamps a voltage at node C to the predetermined zener voltage of the zener diode D3. The voltage at node B, which is the bias voltage Vbias applied to the input terminal Vcc of the control circuit 210A, may reach a level equal to the voltage at node C less the threshold voltage of the third switch M3 and the voltage drop across the diode D2.

During steady-state operation of the example switch-mode power supply 200A, the control circuit 210A may output a switching signal from the output terminal GD1 to the first switch M1 to turn the first switch M1 "on." When the control circuit 210A outputs a switching signal to turn the first switch M1 "on," the voltage at node A may be pulled to ground, which may cause the second switch M2 to be turned "on." When the first switch M1 and the second switch M2 are both "on," current discharged from the inductor L1 may pass through the second switch M2 and the first switch M1 to ground. Also, when the first switch M1 and the second switch M2 are both "on," the diode D2 may be reverse biased when the voltage at node B is at the target level or within the target range of the voltage bias Vbias being applied to the input terminal Vcc.

Further, during steady-state operation, the control circuit 210A may output a switching signal at the output terminal GD1 to turn the switch M1 "off." When the first switch M1 is turned "off," the voltage at node A may rise from zero volts to a threshold voltage that causes the diode D2 to be forward biased. When the second switch M2 is "on" and the diode D2 is forward biased, current being discharged from the inductor L1 may flow through the second switch M2 and the diode D2 to node B. The bias controller 230A may determine that the diode D2 is forward biased by sensing the voltage at node A at the input terminal SNS2 and the voltage at node B at the input terminal SNS1. When the bias controller 230A senses that the diode D2 is forward biased, the bias controller 230A, the bias controller 230A may also determine whether the voltage at node B measured at the input terminal SNS1 is at an or has exceeded an upper bound of a target range. If the voltage at node B is at or has exceed the upper bound, then bias controller 230A may be configured to pull the voltage at node C below a predetermined threshold value using a terminal G2 that is connected to the gate of the second switch M2 at node C. The bias controller 230A may pull the voltage on node C below the predetermined threshold value so that the second switch M2 is turned "off." Alternatively, if the voltage at node B is before the upper bound, then the bias controller 230A may be configured to start or activate a timer. The timer may be activated for a predetermined period of time. In some example configurations, the predetermined period of time may be about one one-hundredth of a time that the capacitor C2 takes to charge from zero volts to the voltage bias Vbias. For example, if the capacitor C2 takes 100 microseconds to charge from zero volts to the voltage bias Vbias, then the predetermined period of time may be one microsecond. When the predetermined period of time elapses, the bias controller 230A may pull the voltage on node C below the predetermined threshold value so that the second switch M2 is turned "off." When the second switch M2 is turned "off," current being discharged from the inductor L2 may pass through the diode D1 to the output of the example switch-mode power supply 200A.

In some example configurations, the bias controller 230A may be configured to adjust TD2 based on a feedback loop to control voltage at node B. The feedback loop may be a loop formed between the input terminal SNS1 that senses the voltage at node B and the terminal G2.

Additionally, like the bias circuit 120 shown in FIG. 1, the bias circuit 220A may be configured to control the bias voltage Vbias applied to the control circuit 210A independent of the switching signals output from GD1. Rather than monitor the switching signal output from GD1 and/or an output Vout of the example switch-mode power supply 200A and determine when to switch off the first switch M1 and the second switch M2, the bias controller 220A may monitor the bias voltage Vbias itself, and determine when to switch the first switch M1 and the second switch M2 "on" based on the level of the bias voltage Vbias.

Figure 3:
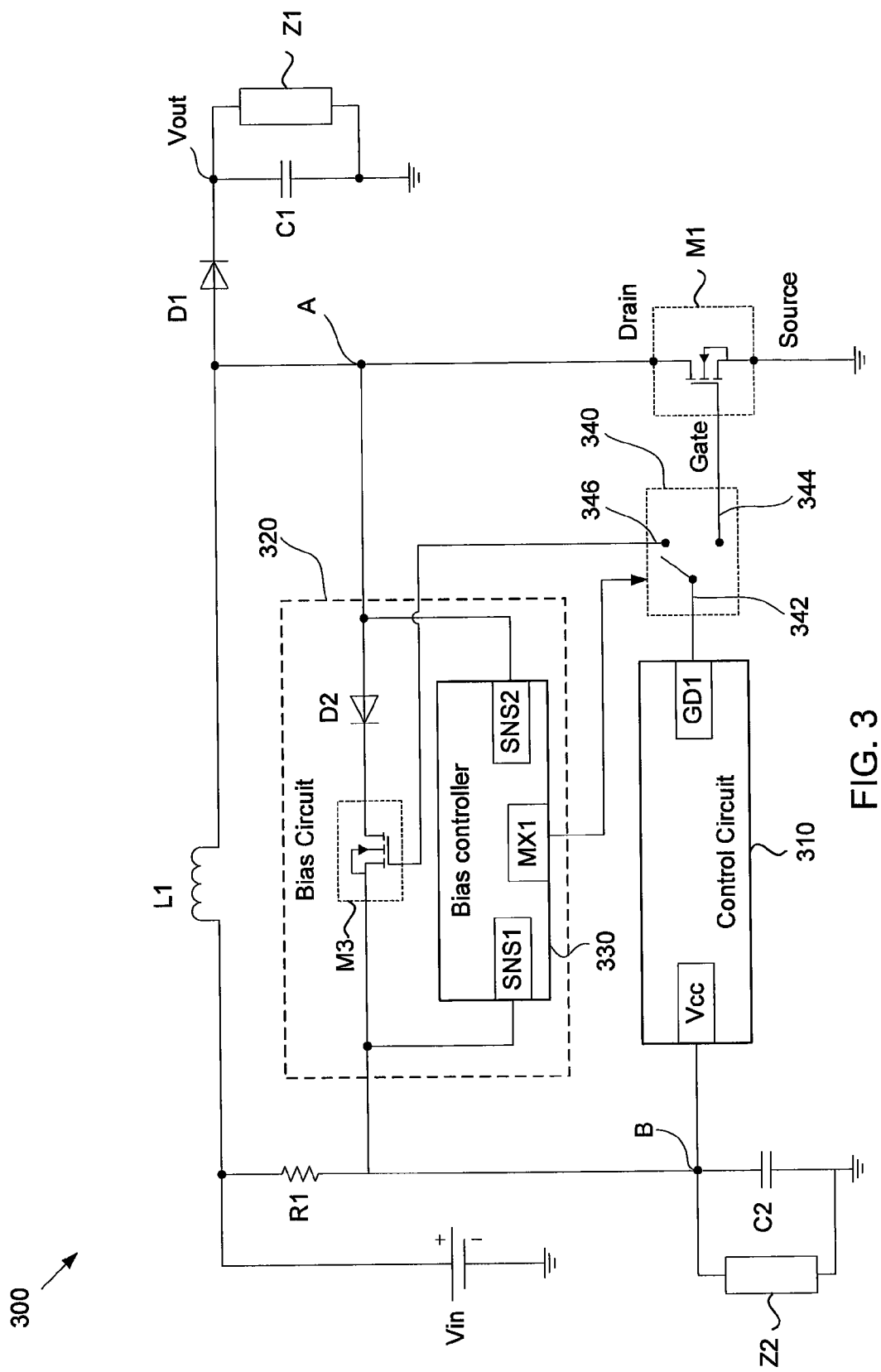
FIG. 3 shows a schematic diagram of a third alternative example switch-mode power supply.

FIG. 3 shows a schematic diagram of an alternative example switch-mode power supply 300. In the alternative example switch-mode power supply 300, a control circuit 310 may be configured to alternatingly send a switching signal to a switch M1 to turn the switch M1 "on" and "off" or to a switch M3 of a bias circuit 320 to turn the switch M3 "on" and "off." In particular, the control circuit 310 may include an output terminal GD1 that is configured to output the switching signals to an input 342 of a multiplexer 340. The multiplexer 340 may include multiple outputs, including a first output 344 and a second output 346. The first output 344 may be connected to an input (e.g., a gate) of the switch M1. The second output 346 may be connected to an input (e.g., a gate) of the switch M3. The input 342 of the multiplexer 340 may be configured to be alternatingly connected to the first output 344 or the second output 346. When the input 342 is connected to the first output 344, the switching signal output from the output terminal GD1 of the control circuit 310 may be sent to the input of the switch M1 to turn the switch M1 "on" and "off." Alternatingly, when the input 342 is connected to the second output 346, the switching signal output from the output the output terminal GD1 of the control circuit 310 may be sent to the input of the switch M3 to turn the switch M3 "on" and "off."

In operation, when the input 342 of the multiplexer 340 is connected to the first output 344, one or more switching signals may be output from the output terminal GD1 to the input terminal of the switch M1 to turn the switch M1 "on" and "off." When the switch M1 is "on," current output from inductor L1 may pass through the switch M1 to ground. When the switch M1 is "off," current output from the inductor L1 may pass through the diode D1 and to the output of the switch-mode power supply 300. Also, when the control circuit 310 is switching the first switch M1 "on" and "off," the switch M3 is "off," and so current may not flow through the diode D2 and the switch M3, from node A to node B.

Alternatively, when the input 342 of the multiplexer 340 is connected to the second output 346, one or more switching signals may be output from the output terminal GD1 to the input terminal of the switch M3 to turn the switch M3 "on" and "off." Because the input 342 of the multiplexer 340 is connected to the second output 346 instead of the first output 344, the switch M1 is "off" and the voltage across the switch M1 (e.g., the drain-source voltage) may increase. When the voltage increases to a threshold level, the diode D2 may be forwarded biased and turn "on." When the switching signal output from the output terminal GD1 turns the switch M3 "on," current output from the inductor L1 may be sent through the diode D2 and the switch M3 of the bias circuit 320, to node B. At node B, charge from the current may be stored in the energy storing circuit C2, and a bias voltage Vbias may be generated across the energy storing circuit C2 and applied to the voltage bias input terminal Vcc. When the switching signal output from the output terminal GD1 turns the switch M3 "off," current output from the inductor L1 may pass through the diode D1 and to the output of the switch-mode power supply 300. Also, when the control circuit 310 is switching M3 "on" and "off," the switch M1 is "off," and so current may not flow through the switch M1 to ground.

As previously described, when current continually flows from node A through the diode D2 and the switch M3 to node B, the bias voltage Vbias generated at node B may increase as charge is stored in the energy storing circuit C2. Also, when no current is flowing to node B, the bias voltage Vbias generated at node B may decrease as charge stored in the energy storing circuit C2 may be discharged into the load Z2. The bias controller 330 may be configured to determine and/or sense the bias voltage Vbias at an input terminal SNS1. Additionally, the bias controller 330 may be configured to operate in a hysteretic manner to control the bias voltage Vbias so that the bias voltage Vbias is at a target level and/or within a target range. In particular, the bias controller 330 may determine a level of the bias voltage Vbias at the input terminal SNS1, and in response to determining the level, the bias controller may output a control signal at an output terminal MX1 to the multiplexer 340 that configures the input terminal 342 to be either connected to first output 344 or the second output 346.

To illustrate, the bias voltage Vbias may have an associated target value that is within a target range having an upper bound and a lower bound. In one example, the target value may be 12 volts, and an upper bound of a target range may be 13 volts, and a lower bound of a target range may be 11 volts, although other voltages may be used. In an initial condition, the input 342 may be connected to either the first output 344 or to the second output 346. If, for example, the input 342 is connected to the first output 344, then no current may flow through the diode D2 and the switch M3 to node B, and the bias voltage Vbias may decrease. The bias voltage Vbias may decrease to the lower bound of the target range. The bias controller 330 may sense at the input terminal SNS1 that the bias voltage Vbias is at the lower bound. In response, the bias controller 330 may send a control signal at the output terminal MX1 to the multiplexer 340 that switches input 342 from being connected to the first output 344 to being connected to the second output 346. In turn, when the input 342 is connected to the second output 346, current may flow through the diode D2 and the switch M3 to node B, and the bias voltage Vbias may increase. The bias voltage Vbias may increase to the upper bound of the target range in several switching cycles. The bias controller 330 may sense at the input terminal SNS1 that the bias voltage Vbias is at the upper bound. In response, the bias controller 330 may send a control signal at the output terminal MX1 to the multiplexer 340 that switches the input 342 from being connected to the second output 346 to the first output 344. In turn, when the input 342 is connected to the first output 344, no current may flow through the diode D2 and the switch M3, and the bias voltage Vbias may decrease.

The bias controller 330 may continually operate to sense the bias voltage Vbias at node B and send a control signal to the multiplexer 340 to maintain the bias voltage Vbias within a target range and/or from exceeding an upper bound of the target range or falling below a lower bound of the target range. In this way, the bias circuit 320 may be configured to supply a bias signal to power the control circuit 310 in a hysteretic manner. When the bias voltage Vbias increases to an upper bound of a target range, the bias controller 330 may configure the multiplexer 340 so that the control circuit 310 is switching the switch M1 "on" and "off" in order to decrease the bias voltage Vbias. Also, when the bias voltage Vbias decreases to a lower bound of a target range, the bias controller 330 may configure the multiplexer 340 so that the control circuit 310 is switching the switch M3 "on" and "off" in order to increase the bias voltage Vbias.

The multiplexer 340 may be configured to shift the level of the signal from GD1 when it passes that signal to the second output 346 so that the third switch M3 receives the appropriate gate voltage level to turn "on" or "off."

Additionally, like the bias circuit 120 shown in FIG. 1, the bias circuit 320 may be configured to control the bias voltage Vbias applied to the control circuit 310 independent of the switching signals output from GD1. Rather than monitor the switching signal output from GD1 and/or an output Vout of the switched-mode power supply 300 and determine whether to send switching signals to either the switch M1 or the switch M3 based on the output from GD1 and/or the output Vout of the switch-mode power supply 100, the bias controller 130 may monitor the bias voltage Vbias itself, and determine whether to send switching signals to either the switch M1 or the switch M3 based on the level of the bias voltage Vbias.

Figure 4:
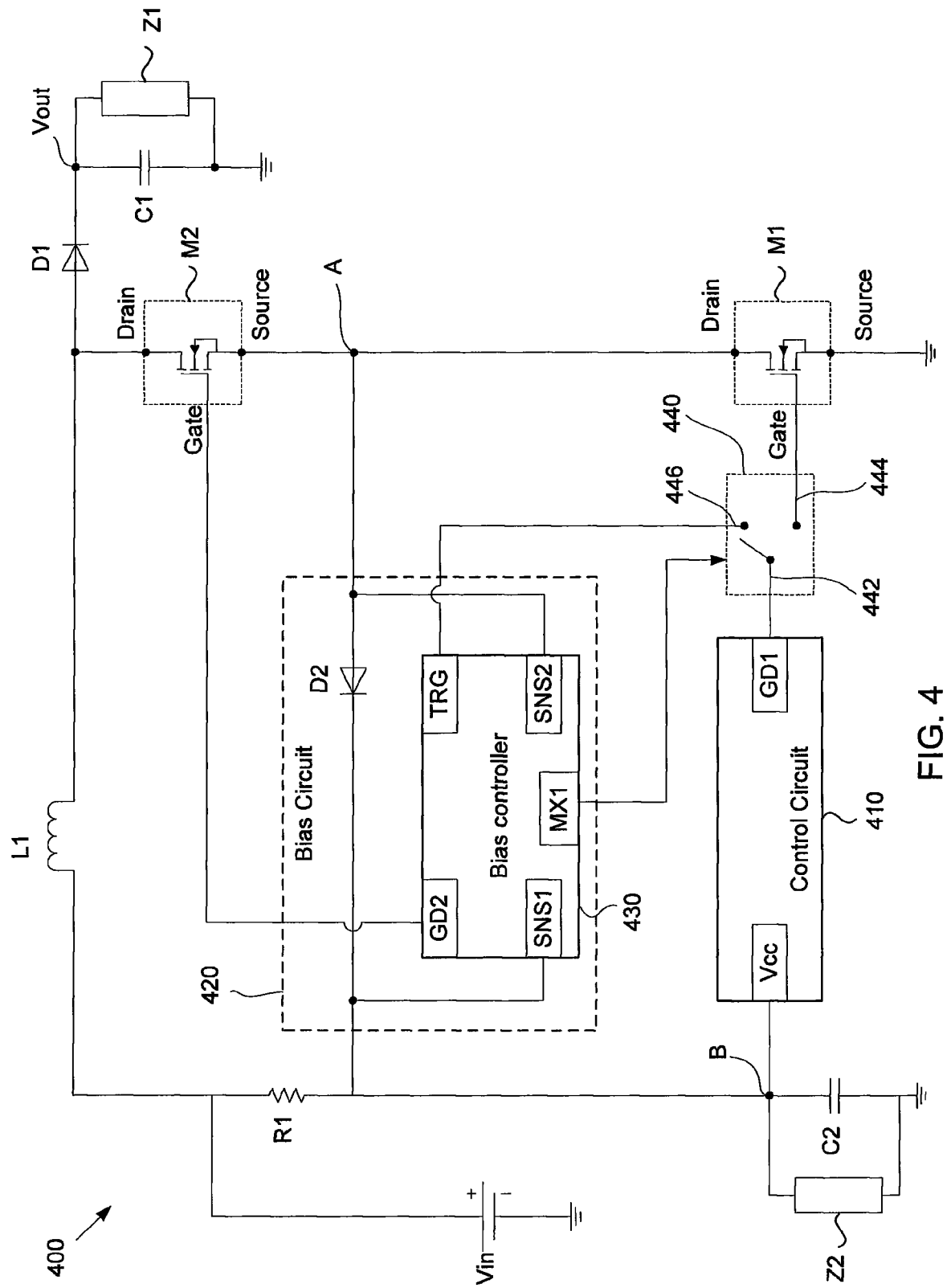
FIG. 4 shows a schematic diagram of a fourth alternative example switch-mode power supply, illustrating an example cascode version of the switch-mode power supply shown in FIG. 3.

FIG. 4 shows a schematic diagram of an example switch-mode power supply 400, illustrating an example cascode configuration of the switch-mode power supply 300. In the example switch-mode power supply 400, a first switch M1 may be connected to a switch M2 in a cascode configuration. The switch-mode power supply 400 may further include a multiplexer 440 that is configured to receive a switching signal output from a control circuit 410 at an input 442. The multiplexer 440 may be configured to communicate the switching signal to either the first switch M1 via a first output 444 or to an input TRG of a bias controller 430 via a second output 446.

In operation, when the multiplexer 440 communicates the switching signal to the first switch M1, the first switch M1 may switch "on" and "off" and the second switch M2 may be in an "off" state. As a result, no current may flow through a diode D2 to node B and the voltage bias Vbias being applied to the voltage bias input terminal Vcc may decrease as charge stored in the energy storing circuit C2 is discharged into the load Z2. Alternatively, when the multiplexer 440 communicates the switching signal to the input terminal TRG of the bias controller 430, the input terminal TRG may communicate the switching signal to an output terminal GD2 that communicates the switching signal to an input (e.g., a gate) of the second switch M3. When communicating the switching signal from the input terminal TRG to the output terminal GD2, the bias controller 430 may be configured to perform any level shifting that is necessary. The level shifting is necessary to raise the gate voltage of M2 substantially above node B or node A voltage to turn on M2. Also, when the multiplexer 440 is communicating the switching signal to the input terminal TRG, the first switch M1 may be maintained in the "off" state. When the second switch M2 is "on" and the first switch M1 is "off," current output from the inductor L1 may flow through the second switch M2, through the diode D2 of the bias circuit 420, and to node B. As a result, the voltage at node B (Vbias) may increase.

During startup, the current through the resistor R1 may charge the capacitor C3 from zero volts to a predetermined voltage that may start the operation of the control circuit 410. The bias controller 430 may sense the voltage at node B through the terminal SNS1. The bias controller 430 may also use the voltage at node B to power itself and/or to generate the switching signal at the output terminal GD2. The bias controller 430 may hold the terminals SNS1 and GD2 at the same level so as to facilitate the second switch M2 being turned "on" or "off" when M1 is turned "on" or "off."

The bias controller 430 may be configured to sense the voltage bias Vbias. The bias controller 430 may also be configured to determine whether the voltage bias Vbias is at an upper bound or a lower bound of a target range. If the voltage bias is at the upper bound, then the bias controller 430 may be configured to output a control signal at an output terminal MX1 that configures the multiplexer 440 to communicate the switching signal to the first switch M1 in order to reduce the voltage bias Vbias. Alternatively, if the voltage bias is at the lower bound, then the bias controller 430 may be configured to output a control signal at the output terminal MX1 that configures the multiplexer 440 to communicate the switching signal to the input terminal TRG of the bias controller 430 in order to increase the voltage bias Vbias.

Figure 5:
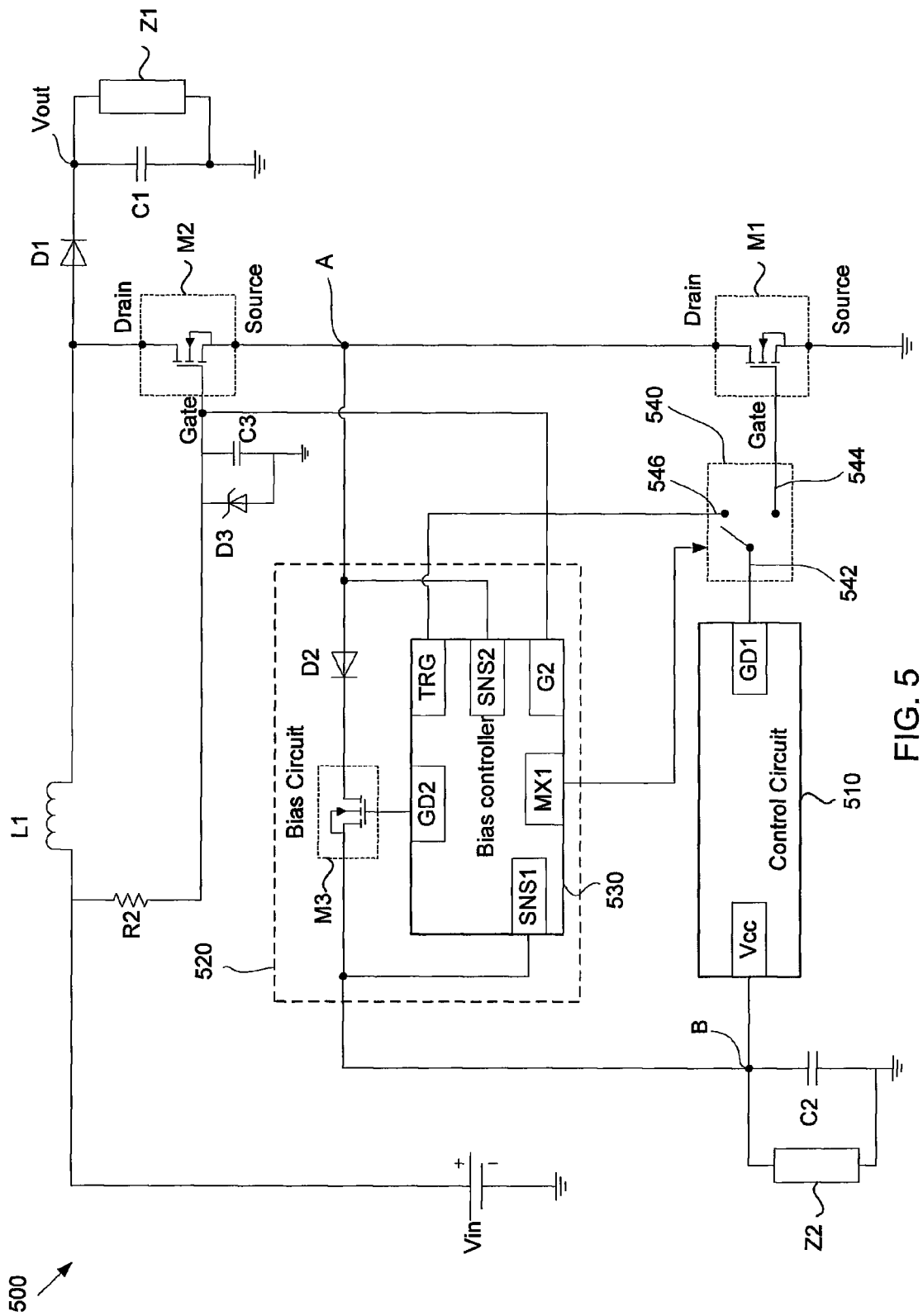
FIG. 5 shows a schematic diagram of a fifth alternative example switch-mode power supply, illustrating another alternative example cascode version of the switch-mode power supply shown in FIG. 3.

FIG. 5 shows a schematic diagram of an example switch-mode power supply 500, illustrating another example cascode configuration of the switch-mode power supply 300. In the example switch-mode power supply 500, a first switch M1 may be connected to a switch M2 in a cascode configuration. The switch-mode power supply 500 may further include a multiplexer 540 that is configured to receive a switching signal output from a control circuit 510 at an input 542. The multiplexer 540 may be configured to communicate the switching signal to either the first switch M1 via a first output 544 or to an input terminal TRG of a bias controller 530 via a second output 546. When the input terminal TRG receives the switching signal, the switching signal may be communicated to an output terminal GD2. The output terminal GD2 may communicate the switching signal to an input (e.g., a gate) of a switch M3 of the bias circuit 530.

Also, in the example switch-mode power supply 500, resistor R2 may be connected from the power source Vin to the gate terminal of M2. A capacitor C3 and a zener diode may also connect from the gate of M2 to ground.

In operation, when the multiplexer 540 communicates the switching signal to the first switch M1, the first switch M1 may switch "on" and "off." When the multiplexer 540 communicates the switching signal to the first switch M1, the switching signal is not being applied to the switch M3. As a result, no current or substantially no current may flow from node A through the diode D2 and the switch M3 to node B, and the bias voltage Vbias may decrease. As the first switch M1 turns "on" and "off," the second switch M2 turns "on" and "off." When both the first switch M1 and the second switch M2 are "on," the current in the inductor L1 may flow to ground. Alternatively, when the first switch M1 and the second switch M2 are both "off," the current in the inductor L1 flows through D1 to the output of the example switch-mode power supply 500.

Alternatively, when the multiplexer 540 communicates the switching signal to the input terminal TRG, the switching signal may be output to the switch M3 at the output terminal GD2. Also, when the multiplexer 540 communicates the switching signal to the input terminal TRG, the first switch M1 may not receive the switching signal and may be maintained in the "off" state, which may forward bias the diode D2, turning the diode D2 "on." When the switching signal turns the switch M3 "on," the second switch M2 may also be configured to turn "on." As a result, current being output from the inductor L1 may flow through the second switch M2, through the diode D2 and the switch M3 to node B, and the bias voltage Vbias may increase. Alternatively, when the switching signal turns the switch M3 "off," the second switch M2 may also be configured to turn "off." As a result, current being output from the inductor L1 may pass through the diode D1 to the output of the switch-mode power supply 500.

The bias controller 530 may be configured to sense the voltage bias Vbias. The bias controller 530 may also be configured to determine whether the voltage bias Vbias is at an upper bound or a lower bound of a target range. If the voltage bias is at the upper bound, then the bias controller 530 may be configured to output a control signal at an output terminal MX1 that configures the multiplexer 540 to communicate the switching signal to the first switch M1 in order to reduce the voltage bias Vbias. Alternatively, if the voltage bias is at the lower bound, then the bias controller 530 may be configured to output a control signal at the output terminal MX1 that configures the multiplexer 540 to communicate the switching signal to the input terminal TRG of the bias controller 530 in order to increase the voltage bias Vbias.

Figure 6:
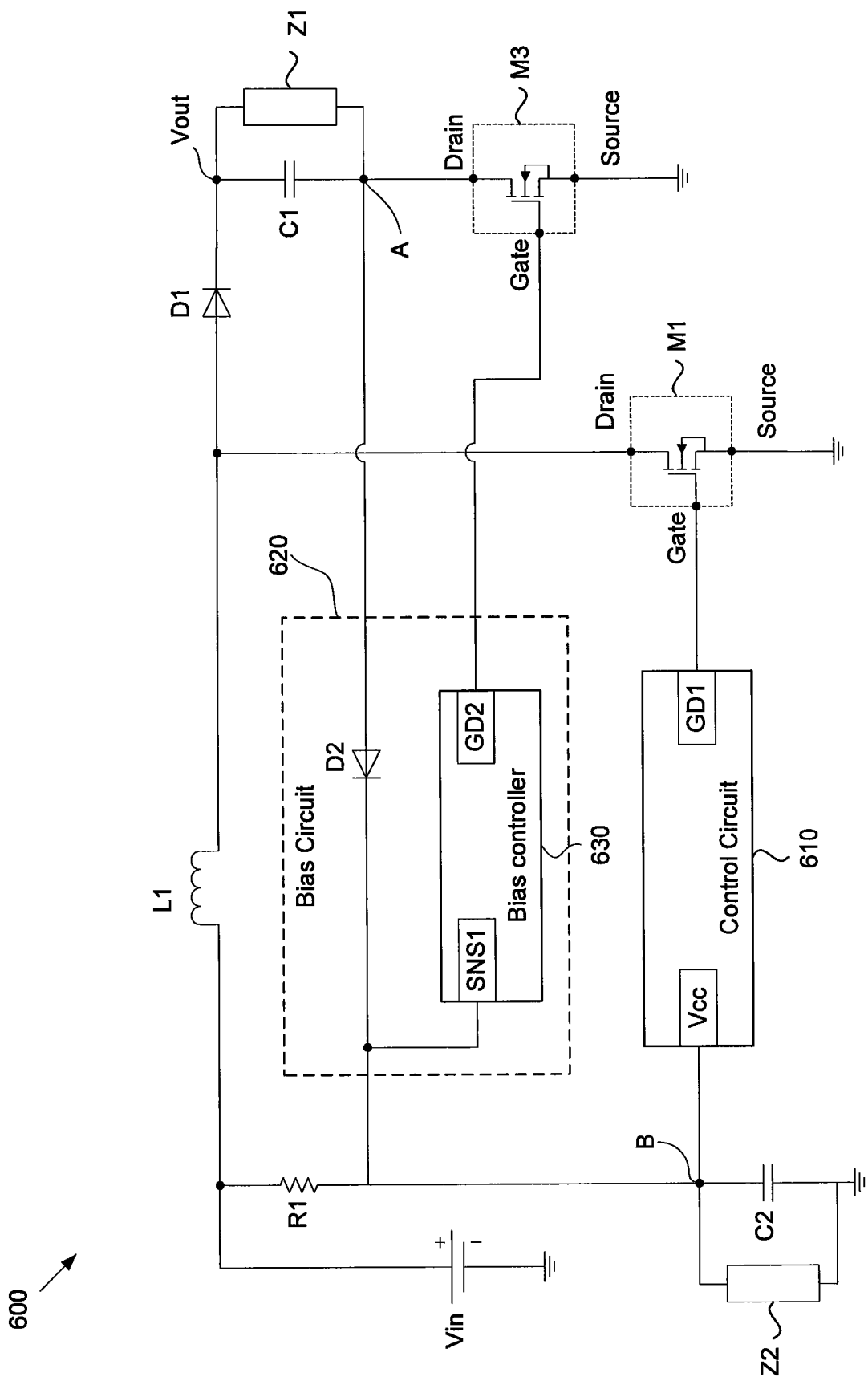
FIG. 6 shows a schematic diagram of a sixth alternative example switch-mode power supply.

FIG. 6 shows a schematic diagram of an alternative example switch-mode power supply 600. In the example switch-mode power supply 600, a switch M3 may be connected in series at node A with an output of the example switch-mode power supply 300, which may include a parallel combination of an output capacitor C1 and an output load Z1. The switch M3 may be connected to the parallel combination so that the output voltage Vout with reference to ground is the voltage across the parallel combination of the output capacitor C1 and the output load Z1 in addition to the voltage across the switch M3 (e.g., the drain-source voltage). A diode D2 of a bias circuit 620 may be connected to the parallel combination and the switch M3 at node A. The diode D2 may also be connected to a voltage bias input terminal Vcc of a control circuit 610 at node B. The control circuit 610 may also include an output terminal GD1 that is configured to output switching signals to a switch M1 that switches the switch M1 "on" and "off."

In operation, the control circuit 610 may output switching signals at the output terminal GD1 to a switch M1 to turn the switch M1 "on" and "off." When the switch M1 is "on," current discharged from an inductor L1 may pass through the switch M1 to ground. Alternatively, when the switch M1 is "off," current discharged from the inductor L1 may pass through the diode D1 to the output of the switch-mode power supply 300. In turn, the current may pass through the output load Z1 to node A. When the switch M3 is "on," current flowing through the output load Z1 to node A may pass through the switch M3 to ground. Also, when the switch M3 is "on," the switch M3 may have a voltage drop of approximately zero volts, causing the switch M3 to act as a short circuit from node A to ground. As such, when the switch M3 is "on," the diode D2 may be reverse biased and no current, or substantially no current, may flow from node A through the diode D2, to node B. Alternatively, when switch M3 is "off," the diode D2 may be forward biased, and current flowing through the output load Z1 to node A may pass through the diode D2 to node B.

As current passes through the diode D2 to node B, charge may be stored in the energy storing circuit C2, generating a bias voltage Vbias that is applied to the voltage bias input terminal Vcc to power the control circuit 610. As previously described, the bias voltage Vbias may increase as the charge is continually stored in the energy storing circuit C2. An input terminal SNS1 of the bias controller 630 may be configured to sense the bias voltage Vbias. In the example switch-mode power supply 600, the bias controller 630 may be configured to control switching of the switch M3. In particular, the bias controller 630 may be configured to output switching signals at an output GD2 to an input terminal (e.g., a gate) of the switch M3 to turn the switch M3 "on" and "off."

The bias controller 630 may be configured to turn the switch M3 "on" for a first period of time and turn the switch M3 "off" for a second period of time. The first period of time may be the same as or different from the second period of time. Also, the first period of time and/or the second period of time may be determined independent of a switching frequency or period of the switching signals sent from the control circuit 610 to the switch M1. In some example configurations, the first period of time and/or the second period of time may be longer in duration than the time period of the switching signals output from the control circuit 610. In other example configurations, the first period of time and/or the second period of time may be equal to or less than the time period of the switching signals output from the control circuit 610.

The first period of time and/or the second period of time may be dependent upon a target range associated with the bias voltage Vbias. The target range may include and/or be centered around a target level. The target range may have an upper bound and a lower bound. When the switch M3 is turned "on," the bias voltage Vbias at node B may decrease because no current or substantially no current may flow through the diode D2, and charge stored in the energy storing circuit C2 may be discharged into the load Z2 and/or the voltage bias input terminal Vcc. The bias controller 630 may sense the bias voltage Vbias at the input terminal SNS1. When the bias voltage Vbias decreases to the lower bound of the target range, the bias controller 630 may be configured to output a switching signal from the output terminal GD2 to the switch M3 that turns the switch M3 from "on" to "off." Alternatively, the bias controller 630 may be configured to cease outputting the switching signal. When the switch M3 is turned "off," the bias voltage Vbias at node B may increase as current may flows through diode D2 to node B. The switch M3 may be maintained in the "off" state, and while the switch M3 is "off," the bias voltage Vbias may increase as current passes through the diode D2 and charge is stored in the energy storing circuit C2. The bias controller 630 may sense the increasing bias voltage Vbias at the input terminal SNS1. When the bias voltage Vbias increases to the upper bound of the target range, the bias controller 630 may be configured to output a signal from the output terminal GD2 that turns the switch M3 from "off" to "on." As previously described, when the switch M3 is turned "on," current passing through the output load Z1 to node A may not pass through the diode D2 to node B, and the bias voltage Vbias at node B may decrease.

The bias controller 630 may continually operate to sense the bias voltage Vbias at node B and send a control signal to the switch M3 to maintain the bias voltage Vbias within a target range and/or from exceeding an upper bound of the target range or falling below a lower bound of the target range. In this way, the bias circuit 620 may be configured to supply a bias signal to power the control circuit 610 in a hysteretic manner. When the bias voltage Vbias increases to an upper bound of a target range, the bias controller 630 may control the switch M3 to increase or decrease the bias voltage Vbias, depending on whether the bias voltage Vbias is at the upper bound or the lower bound.

Additionally, like the bias circuits 120 and 320 shown in FIGS. 1 and 3, the bias circuit 620 may be configured to control the bias voltage Vbias applied to the control circuit 310 independent of the switching signals output from GD1. Rather than monitor the switching signal output from GD1 and/or an output Vout of the switched-mode power supply 600 and determine whether to the switch M3 "on" or "off" based on the output from GD1 and/or the output Vout of the switch-mode power supply 600, the bias controller 630 may monitor the bias voltage Vbias itself, and determine whether to the switch M3 "on" or "off" based on the level of the bias voltage Vbias.

FIG. 6 shows the switch M3 as a component of the example switch-mode power supply 600 that is external to the bias circuit 620. In other example configurations, the switch M3 may be a component of the bias circuit 620, similar to the switch M3 being a component of the bias circuit 120 shown in FIG. 1 and the bias circuit 320 shown in FIG. 3.

Figure 7:
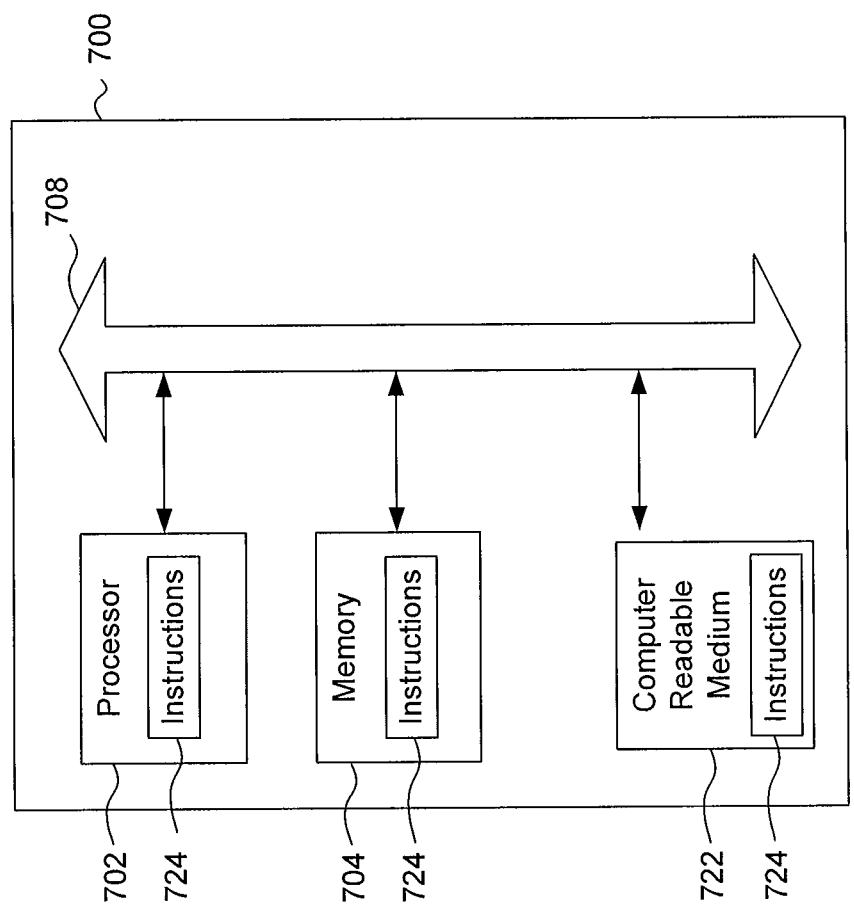
FIG. 7 shows an example processing system that may be implemented as one or more components of a switch-mode power supply.

One or more of the control circuits 110, 210, 310, 410, 510, 610, the bias circuits 120, 220, 320, 410, 520, 620, and/or the bias controllers 130, 230, 330, 430, 530, 630 shown in FIGS. 1-6 may be and/or may include a portion or all of one or more processing systems of various kinds, such as the processing system 700 in FIG. 7. In some examples, the processing system 700 may include a processor and memory. The processing system 700 may include a set of instructions that can be executed to cause the processing system 700 to perform any one or more of the methods or computer based functions disclosed.

In FIG. 7, the example processing system 700 may include a processor 702, e.g., a central processing unit (CPU), a graphics processing unit (GPU), or both. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The term "module" may be defined to include a plurality of executable modules. As described herein, the modules are defined to include software, hardware or some combination thereof executable by a processor, such as processor 702. Software modules may include instructions stored in memory, such as memory 704, or another memory device, that are executable by the processor 702 or other processor. Hardware modules may include various devices, components, circuits, gates, circuit boards, and the like that are executable, directed, and/or controlled for performance by the processor 702.

The processing system 700 may include a memory 704, such as a memory 704 that can communicate via a bus 708. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 704 includes a cache or random access memory for the processor 702. In alternative examples, the memory 704 is separate from the processor 702, such as a cache memory of a processor, the system memory, or other memory. The memory 704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 402. The functions, acts or tasks illustrated in the figures or described may be performed by the programmed processor 702 executing the instructions stored in the memory 704. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The present disclosure contemplates a computer-readable medium 722 in which one or more sets of instructions 724, e.g. software, can be embedded. Further, the instructions 724 may embody one or more of the methods or logic as described. In a particular example, the instructions 724 may reside completely, or at least partially, within the memory 704 and/or within the processor 702 during execution by the processing system 700. The memory 704 and the processor 702 also may include computer-readable media as discussed above. While the computer-readable medium is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In an example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement various parts of the switch-mode power supplies. Applications that may include the apparatus and systems can broadly include a variety of electronic and computer systems. One or more examples described may implement functions using two or more specific interconnected hardware modules or devices with related control and data signals that can be communicated between and through the parts of the switch-mode power supplies, or as portions of an application-specific integrated circuit. The present system encompasses software, firmware, and hardware implementations.

Figure 8:
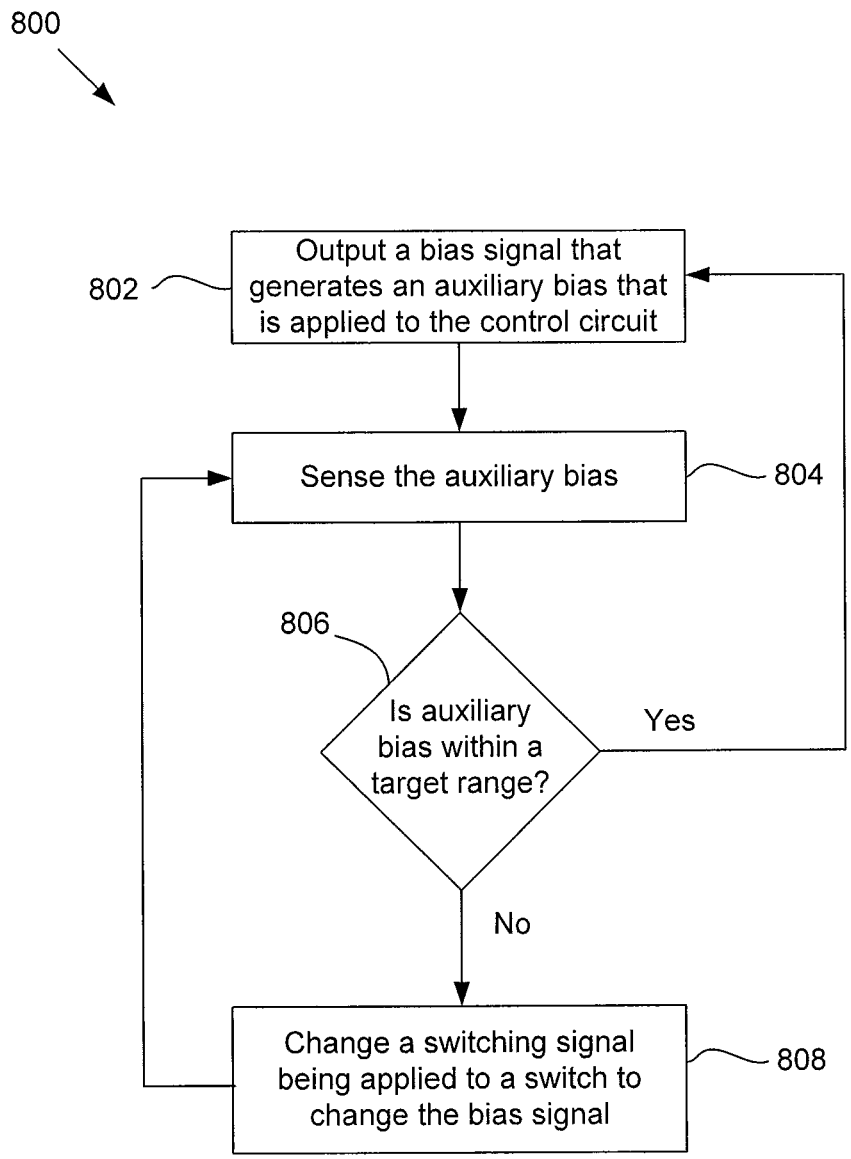
FIG. 8 shows a flow diagram of an example method of operating a power supply to maintain an auxiliary bias within a target range.

FIG. 8 shows a flow diagram of an example method 800 of operating a power supply to maintain an auxiliary bias being applied to a control circuit of the power supply within a target range. At block 802, a bias signal may be output from a bias circuit of the power supply. The bias signal may be used to generate the auxiliary bias. At block 804, the bias circuit and/or a bias controller of the bias circuit, may determine and/or sense a level of the auxiliary bias being applied to the control circuit. At block 806, the bias circuit and/or the bias controller of the bias circuit, may determine whether the level is with a target range. If the level is within the target range, then the method may proceed back to block 802, where bias circuit continues outputting the bias signal.

Alternatively, if the auxiliary bias is not within the target range, then the method may proceed to block 808, where the bias circuit and/or the bias controller may change a switching signal being applied to a switch that outputs the bias signal. By changing the switching signal, the bias signal being output may change, which increases or decreases the auxiliary bias. As previously described, a dc level of the switching signal may be changed to a level that meets or exceeds a threshold level that turns the switch "on" in order to increase the auxiliary bias; or the dc level may be changed to a level that is below a threshold level that turns the switch "off" in order to decrease the auxiliary bias. Alternatively, a duty cycle of the switching signal may be increased to increase an amount of time that the switch is "on" in order to increase the auxiliary bias; or the duty cycle may be decreased to decrease an amount of time that the switch is "on" in order to decrease the auxiliary bias. Also at block 808, the changed switching signal may be applied to the switch to change the bias signal, and in turn the auxiliary bias. The method may proceed back to block 804, where the bias controller senses the auxiliary bias.

Figure 9:
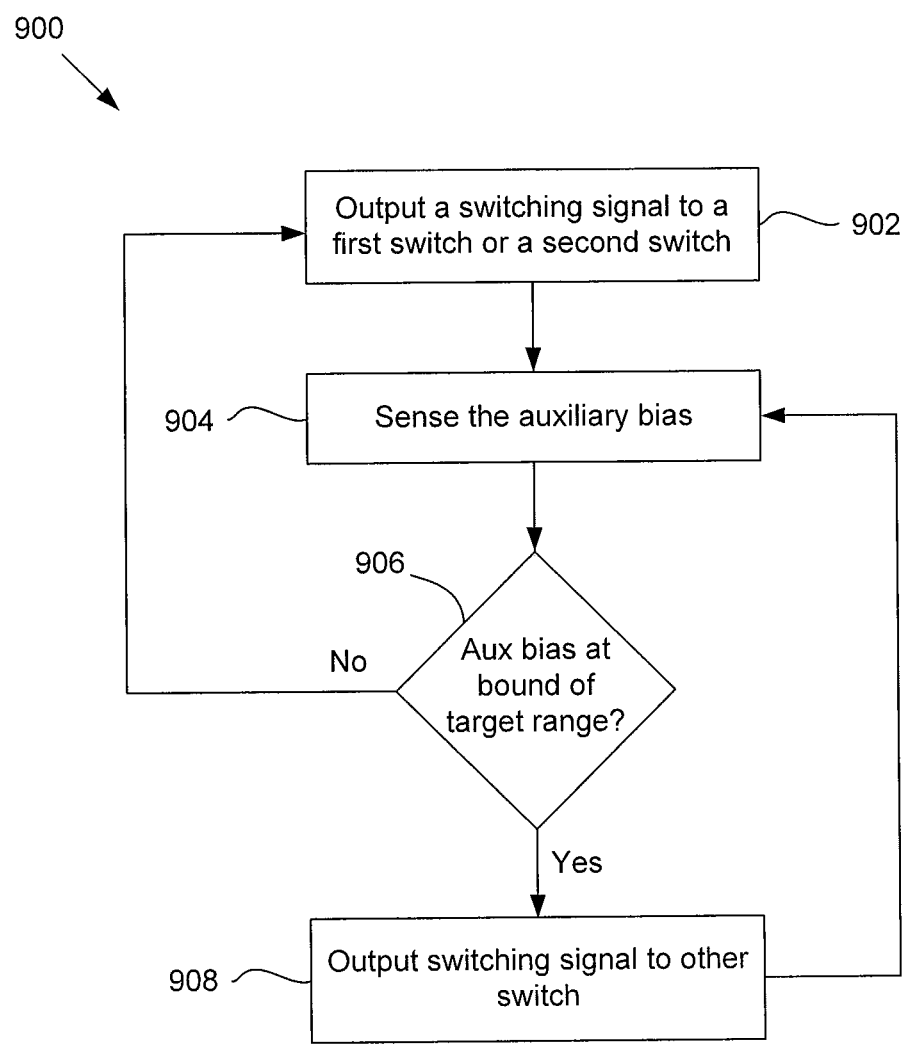
FIG. 9 shows a flow diagram of an alternative method of operating a power supply to maintain an auxiliary bias within a target range.

FIG. 9 shows a flow diagram of an alternative example method 900 of operating a power supply to maintain an auxiliary bias being applied to a control circuit of the power supply within a target range. At block 902 a switching signal is output from a control circuit to a multiplexer, and the multiplexer may communicate the switching signal to either a first switch or a second switch. The second switch may output a bias signal that is used to generate an auxiliary bias used to power the control circuit. At block 904, a bias controller may determine and/or sense the auxiliary bias. At block 906, the bias controller may determine whether the auxiliary bias is at an upper bound or a lower bound of a target range. If the auxiliary bias is not at the upper bound or the lower bound, then the method may proceed back to block 902, where the multiplexer continues and/or maintains communicating the switching signal to the same switch that the multiplexer has been communicating the switching signal to. Alternatively, if the auxiliary bias is at the upper bound or the lower bound of the target range, then at block 908, the multiplexer may output the switching signal to the other of switch. By switching communication of the switching signal to the other switch, the auxiliary bias may be maintained within the target range. After switching communication of the switching signal to the other switch, the method may proceed back to block 904, where the auxiliary bias is sensed.

Figure 10:
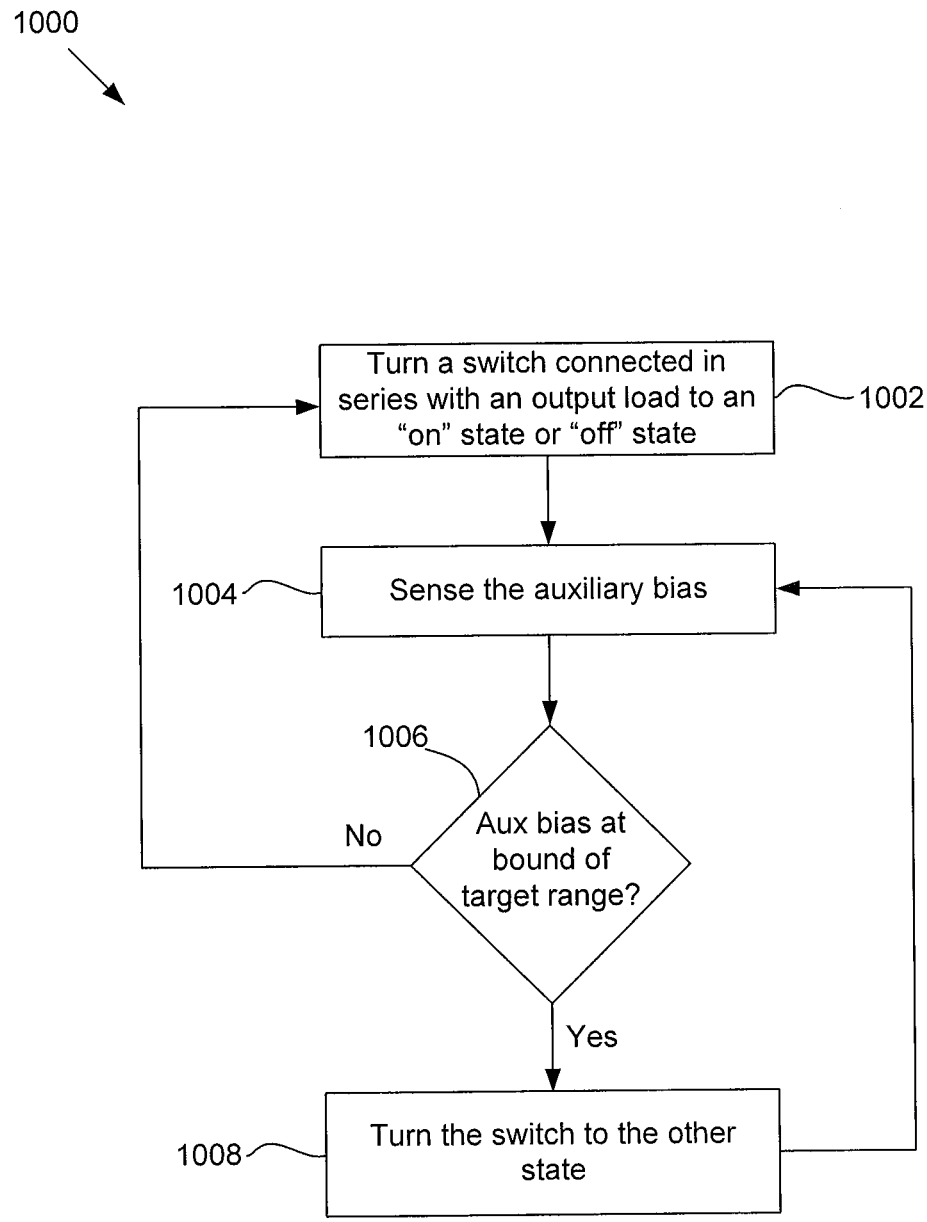
FIG. 10 shows a flow diagram of another alternative method of operating a power supply to maintain an auxiliary bias within a target range.

FIG. 10 shows a flow diagram of an alternative example method 1000 of operating a power supply to maintain an auxiliary bias being applied to a control circuit of the power supply within a target range. At block 1002, a switching signal may be applied to a switch that turns the switch "on" or "off." At block 1004, a level of the auxiliary bias may be sensed by the bias circuit. At block 1006, the bias circuit may determine whether the auxiliary bias is at an upper bound or a lower bound of a target range. If the auxiliary bias is not at the upper bound or the lower bound, then the method may proceed back to block 1002, where the switch is maintained in the "on" state or the "off" state. Alternatively, if the auxiliary bias is at the upper bound or the lower bound, then the method may proceed to block 1008, where the switch is turned to the other state. For example, if the switch is "on," then the switch may be turned to being "off." Alternatively, if the switch is "off," then the switch may be turned to being "on." After turning the switch to the other state, the method may proceed back to block 1004, where the auxiliary bias is sensed.

Various embodiments described herein can be used alone or in combination with one another. The foregoing detailed description has described only a few of the many possible implementations of the present invention. For this reason, this detailed description is intended by way of illustration, and not by way of limitation.

I claim:

1. A power supply comprising:
a switch;
a first circuit that is configured to output a switching signal to control switching of the switch; and
a second circuit that is configured to:
generate a bias signal that is used to generate a bias voltage that powers the first circuit;
sense the bias voltage; and
determine whether to change the bias signal to adjust the bias voltage based on the sense of the bias voltage.

2. The power supply of claim 1, wherein the determination of whether to change the bias signal to adjust the bias voltage based on the sense of the voltage comprises a determination whether to change the bias signal based on a comparison of the bias voltage and a predetermined value.

3. The power supply of claim 2, wherein the predetermined value is one of an upper bound and a lower bound of a target range.

4. The power supply of claim 1, wherein the switch comprises a first switch, and wherein the second circuit comprises:
a second switch configured to output the bias signal; and
a controller in communication with the second switch, wherein the controller is configured to control switching of the second switch to change the bias signal being output from the second switch.

5. The power supply of claim 4, wherein the controller is configured to change a duty cycle of a switching signal being applied to the second switch to change the bias signal.

6. The power supply of claim 4, wherein the controller is configured to turn the second switch "on" to increase the bias voltage being applied to the first circuit, and to turn the second switch "off" to decrease the bias voltage being applied to the first circuit.

7. The power supply of claim 4, wherein the bias circuit further comprises:
a diode connected to the second switch,
wherein the diode is configured to turn "on" when the first switch turns "off," and
wherein the bias signal is output from the bias circuit when the diode and the second switch are "on."

8. The power supply of claim 1, wherein the switch comprises a first switch,
wherein the second circuit comprises a second switch configured to output the bias signal, and wherein the switch-mode power supply further comprises:
a multiplexer alternatingly in communication with the first switch and the second switch, the multiplexer configured to receive the switching signal from the first circuit; and alternatingly communicate the switching signal to the first switch and the second switch,
wherein the second circuit is configured to change the bias signal when the multiplexer switches communicating the switching signal from one of the first switch and the second switch to the other of the first switch and the second switch.

9. The power supply of claim 8,
wherein the first switch is configured to be in an "off" state and the second switch is configured to output the bias signal to increase the bias voltage when the multiplexer communicates the switching signal to the second switch, and
wherein the second switch is configured to be in an "off" state and the first switch is configured to draw current to decrease the bias voltage when the multiplexer communicates the switching signal to the first switch.

10. The power supply of claim 8, wherein the second circuit comprises:
a controller that is configured to:
configure the multiplexer to communicate the switching signal to the first switch when the bias voltage is at an upper bound of a target range; and
configure the multiplexer to communicate the switching signal to the second switch when the bias voltage is at a lower bound of a target range.

11. The power supply of claim 1, wherein the switch comprises a first switch, and wherein the power supply further comprises a second switch connected in series with an output load,
wherein the second circuit comprises:
a diode configured to output the bias signal; and
a controller configured to control switching of the second switch,
wherein the controller is configured to turn the second switch "on" to draw current through the second switch so that the diode is "off" and the bias voltage decreases, and
wherein the controller is configured to turn the second switch "off" to turn the diode "on" so that the diode outputs the bias signal to increase the bias voltage.

12. The power supply of claim 11, wherein the controller is configured to:
turn the second switch "on" when the bias voltage is at an upper bound of a target range; and
turn the second switch "off" when the bias voltage is at a lower bound of a target range.

13. The power supply of claim 1, wherein the switch comprises a first switch, the power supply further comprising a second switch connected to the first switch in a cascode configuration,
wherein the second circuit is configured to:
receive current from the second switch; and
change the bias signal by outputting at least some of the current received from the second switch.

14. A method of maintaining an auxiliary bias of a power supply within a target range, the method comprising:
outputting, with a bias circuit, a bias signal that generates the auxiliary bias, the auxiliary bias powering a control circuit that controls switching of a switch of the power supply;
sensing, with the bias circuit, the auxiliary bias; and
in response to sensing the auxiliary bias, changing, with the bias circuit, the bias signal being output from the bias circuit to adjust the auxiliary bias.

15. The method of claim 14, wherein the switch comprises a first switch, the method further comprising:
in response to sensing the auxiliary bias, changing, with a controller of the bias circuit, a switching signal applied to a second switch to change the bias signal.

16. The method of claim 15, wherein changing the switching signal applied to the second switch to change the bias signal comprises:
increasing, with the controller of the bias circuit, a duty cycle of the switching signal to increase an amount of the bias signal being output from the bias circuit; and
decreasing, with the controller of the bias circuit, the duty cycle of the switching signal to decrease an amount of the bias signal being output from the bias circuit.

17. The method of claim 14, wherein the switch comprises a first switch, the method further comprising:
receiving, with a multiplexer, a switching signal from the control circuit;
in response to sensing the auxiliary bias, outputting, with the controller of the bias circuit, a control signal to the multiplexer that configures the multiplexer to output the received switching signal to one of the first switch and a second switch to change the bias signal, the second switch outputting the bias signal.

18. The method of claim 17, further comprising:
in response to sensing that the auxiliary bias is at an upper bound of a target range, outputting, with the controller of the bias circuit, a first control signal that configures the multiplexer to communicate the switching signal to the first switch, and
in response to sensing that the auxiliary bias is at a lower bound of a target range, outputting, with the controller of the bias circuit, a second control signal that configures the multiplexer to communicate the switching signal to the second switch.

19. The method of claim 14, wherein the switch comprises a first switch, the method further comprising:
switching a second switch to an "on" state to decrease the auxiliary bias, the second switch being connected in series with an output load; and
switching the second switch to an "off" state to increase the auxiliary bias.

20. The method of claim 19, wherein the second switch is switched to the "on" state in response to sensing that the auxiliary bias is at a lower bound of a target range, and wherein the second switch is switched to the "off" state in response to sensing that the auxiliary bias is at an upper bound of the target range.

21. A lighting system comprising:
a power supply comprising:
a switch;
a first circuit that is configured to output a switching signal to control switching of the switch;
a second circuit comprising a feedback loop that is configured to:
output a bias signal that is used to generate an auxiliary bias that powers the first circuit;
sense the auxiliary bias; and
change the bias signal to adjust a level of the auxiliary bias in response to the sensed auxiliary bias; and
a light source comprising at least one light-emitting diode connected to an output of the power supply.

22. The lighting system of claim 21, wherein the switch comprises a first switch, and wherein the second circuit comprises:
a second switch configured to output the bias signal; and
a controller in communication with the switch,
wherein the controller is configured to control switching of the second switch to change the bias signal being output from the second switch.

23. The lighting system of claim 21, wherein the switch comprises a first switch,
wherein the second circuit comprises a second switch configured to output the bias signal, and wherein the power supply further comprises:
a multiplexer alternatingly in communication with the first switch and the second switch, the multiplexer configured to receive the switching signal from the first circuit; and alternatingly communicate the switching signal to the first switch and the second switch,
wherein the second circuit is configured to change the bias signal when the multiplexer switches communicating the switching signal from one of the first switch and the second switch to the other of the first switch and the second switch.

24. The lighting system of claim 21, wherein the switch comprises a first switch, and wherein the power supply further comprises a second switch connected in series with an output load,
wherein the second circuit comprises:
a diode configured to output the bias signal; and
a controller configured to control switching of the second switch,
wherein the controller is configured to turn the second switch "on" to draw current through the second switch so that the diode is "off" and the bias voltage decreases, and
wherein the controller is configured to turn the second switch "off" to turn the diode "on" so that the diode outputs the bias signal to increase the bias voltage.

25. A lighting system comprising:
a power supply comprising:
a switch;
a first circuit that is configured to output a switching signal to control switching of the switch; and
a second circuit that is configured to:
generate a bias signal that is used to generate a bias voltage that powers the first circuit;
sense the bias voltage; and
determine whether to change the bias signal to adjust the bias voltage based on the sense of the bias voltage; and
a light source comprising at least one light-emitting diode connected to an output of the power supply.

* * * * *